US010890717B2

(12) United States Patent
Melloni et al.

(10) Patent No.: US 10,890,717 B2
(45) Date of Patent: Jan. 12, 2021

(54) OPTICAL DELAY METHOD AND SYSTEM

(71) Applicant: POLITECNICO DI MILANO, Milan (IT)

(72) Inventors: Andrea Melloni, Milan (IT); Daniele Melati, Milan (IT)

(73) Assignee: POLITECNICO DI MILANO, Milan (IT)

( * ) Notice: Subject to any disclaimer, the term of this patent is extended or adjusted under 35 U.S.C. 154(b) by 0 days.

(21) Appl. No.: 16/614,260

(22) PCT Filed: May 15, 2018

(86) PCT No.: PCT/IT2018/050083
§ 371 (c)(1),
(2) Date: Nov. 15, 2019

(87) PCT Pub. No.: WO2018/211541
PCT Pub. Date: Nov. 22, 2018

(65) Prior Publication Data
US 2020/0081189 A1 Mar. 12, 2020

(30) Foreign Application Priority Data
May 17, 2017 (IT) ........................ 102017000053579

(51) Int. Cl.
*G02B 6/28* (2006.01)
*H04B 10/508* (2013.01)

(52) U.S. Cl.
CPC ......... *G02B 6/2861* (2013.01); *H04B 10/508* (2013.01); *H04B 2210/006* (2013.01)

(58) Field of Classification Search
None
See application file for complete search history.

(56) References Cited

U.S. PATENT DOCUMENTS 5,044,715 A * 9/1991 Kawachi ............ G02B 6/12004
385/42
5,572,611 A * 11/1996 Jinguji ............... G02B 6/12007
385/17

(Continued)

FOREIGN PATENT DOCUMENTS

| EP | 1388961 A1 | 2/2004 |
| WO | 2005/106550 A1 | 11/2005 |
| WO | 2016/170466 A1 | 10/2016 |

OTHER PUBLICATIONS

International Search Report and Written Opinion for PCT/IT2018/050083, dated Jul. 3, 2018.

*Primary Examiner* — Chad H Smith
(74) *Attorney, Agent, or Firm* — Merchant & Gould P.C.

(57) ABSTRACT

An optical delay method, and related system, includes propagating an optical signal along an optical delay device (10) with a first stage (11) having a variable input coupler (20) and a delay element. An intermediate stage (12) has a variable intermediate coupler (30) and a delay element. An output stage (13) includes a variable output coupler (40). The method sets a coupling ratio of the input (20) and output couplers (40) equal to a value K1 selected among a plurality of at least three values. A coupling ratio of the intermediate coupler (30) is set equal to a value K2, wherein K1=$\sin^2$(θ) & K2=$\sin^2$(A*θ) with θ greater than or equal to zero and less than or equal to π/2 and A greater than or equal to 1.5 and less than or equal to 2.5.

10 Claims, 5 Drawing Sheets

(56) References Cited

U.S. PATENT DOCUMENTS

| | | | | |
|---|---|---|---|---|
| 5,596,661 | A | * | 1/1997 | Henry ................ G02B 6/12007 385/24 |
| 5,703,975 | A | * | 12/1997 | Miller ................... G02F 1/3136 372/6 |
| 6,795,596 | B2 | | 9/2004 | Bülow |
| 9,257,745 | B2 | | 2/2016 | Vidal Drummond et al. |
| 2002/0021856 | A1 | * | 2/2002 | Hatayama .......... G02B 6/12007 385/15 |
| 2002/0076131 | A1 | * | 6/2002 | Mohtat ............. G02B 6/29355 385/14 |
| 2002/0154850 | A1 | * | 10/2002 | Xie .................... G02B 6/29302 385/15 |
| 2003/0095738 | A1 | * | 5/2003 | Hatayama .......... H04B 10/2935 385/14 |
| 2003/0128923 | A1 | * | 7/2003 | Takiguchi ............ H04B 10/503 385/27 |
| 2004/0022493 | A1 | * | 2/2004 | Takiguchi .......... G02B 6/29355 385/42 |
| 2004/0136646 | A1 | * | 7/2004 | Shahar .................... H04J 14/02 382/24 |
| 2004/0136647 | A1 | * | 7/2004 | Mizuno ............. G02B 6/29355 385/24 |
| 2005/0058397 | A1 | * | 3/2005 | Doerr ................ G02B 6/29394 385/39 |
| 2005/0058398 | A1 | * | 3/2005 | Doerr ................ G02B 6/12007 385/39 |
| 2008/0266639 | A1 | * | 10/2008 | Melloni ............. G02B 6/29352 359/241 |
| 2011/0150388 | A1 | * | 6/2011 | Shin .................... G02B 6/3556 385/16 |

* cited by examiner

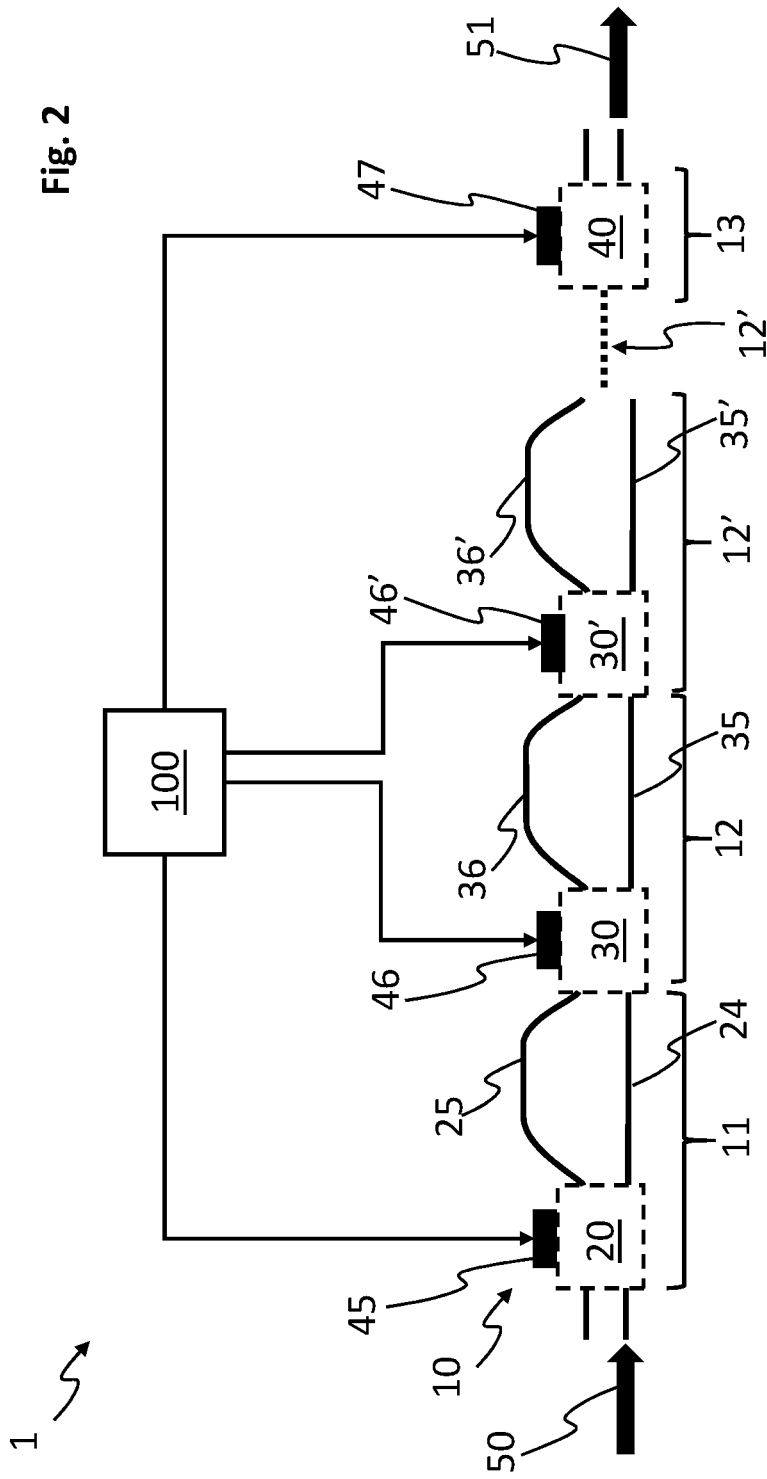

_US 10,890,717 B2_

OPTICAL DELAY METHOD AND SYSTEM

This application is a National Stage Application of PCT/IT2018/050083, filed May 18, 2018, which claims benefit of Italian Patent Application No. 102017000053579, filed May 17, 2017, and which applications are incorporated herein by reference. To the extent appropriate, a claim of priority is made to each of the above-disclosed applications.

BACKGROUND OF THE INVENTION

The present invention relates to an optical delay method and system, in particular of the interferometric type.

SUMMARY OF THE INVENTION

U.S. Pat. No. 9,257,745 B2 discloses a photonic system for forming the electric field emitted by a 'phased array' antenna, the system being based on a tunable delay photon line consisting of a tunable optical Mach-Zehnder interferometer with a predefined time delay difference between the two branches.

WO 2016/170466 A1 discloses a photonic system for forming the beam of a radio signal received from a 'phased array' antenna, the system comprising optical tunable delay lines with a periodic frequency response.

US 2003/0128923 A1 discloses an optical pulse sequence generator comprising a variable optical delay circuit comprising in turn variable asymmetric Mach-Zehnder interferometers connected in cascade.

U.S. Pat. No. 6,795,596 B2 discloses a variable optical delay line comprising a first phase variation stage, a first delay stage and a second phase variation stage forming a Mach-Zehnder structure which generates a predetermined delay.

The Applicant has found that the known optical delay systems have some drawbacks and/or can be improved in some aspects.

For example, the Applicant has observed that the optical tunable delay systems described in U.S. Pat. No. 9,257,745 B2 and WO 2016/170466 A1 introduce an attenuation of the optical signal also at the operating wavelength.

For example, the Applicant has observed that the variable optical delay systems described in US 2003/0128923 A1, in addition to having a complex structure, introduce variable optical delays at discrete step.

For example, the Applicant has observed that the variable optical delay line described in U.S. Pat. No. 6,795,596 B2 does not have a single working point and has a complex structure and function. Furthermore, this delay line has a limited bandwidth.

An object of the present invention is to provide an optical delay method and system which solves one or more of the problems described above.

This object is achieved by an optical delay method and system in accordance with the appended claims and/or having the following characteristics.

According to an aspect the invention relates to an optical delay method comprising:
providing an optical delay device comprising:
 a first stage comprising a variable input coupler having a first input port and a first and a second output port, and a first and a second optical path (directly) optically connected, respectively, to said first and second output ports, wherein a difference in optical length between the first and second optical paths is greater than zero;
 an intermediate stage comprising:
  an intermediate variable coupler having a first and a second input port and a first and a second output port, wherein the first and second input ports of the intermediate coupler are (directly) optically connected, respectively, to the first and second optical paths downstream of the first and second optical paths;
  a third and a fourth optical path (directly) optically connected to said first and second output ports of the intermediate coupler, respectively, downstream of the intermediate coupler, wherein a difference in optical length between the third and fourth optical paths is greater than zero;
 an output stage comprising a variable output coupler having a first and a second input port and a first output port, wherein the first and second input ports of the output coupler are optically connected, respectively, to the third and fourth optical paths, downstream of the third and fourth optical paths;
selecting a value K1 among a plurality of values comprising a minimum value greater than or equal to zero, a maximum value less than or equal to one and at least one value comprised between said minimum and maximum values, wherein K1=$\sin^2(\theta)$ with $\theta$ greater than or equal to zero and less than or equal to $\pi/2$,
setting a coupling ratio of said input and output couplers equal to said selected value K1,
setting a coupling ratio of said intermediate coupler equal to a value K2, wherein $$K2=\sin^2(A*\theta)$$

with A greater than or equal to 1.5 and less than or equal to 2.5;
introducing a first optical signal into said first input port of said input coupler;
delaying said first optical signal by propagating said first optical signal along said optical delay device;
picking up said delayed first optical signal from said first output port of said output coupler.

According to an aspect, the invention relates to an optical delay system comprising:
an optical delay device comprising:
 a first stage comprising a variable input coupler having a first input port and a first and a second output port and a first and a second optical path (directly) optically connected to said first and second output ports, respectively, wherein a difference in optical length between the first and second optical paths is greater than zero;
 an intermediate stage comprising:
  an intermediate variable coupler having a first and a second input port and a first and a second output port, wherein the first and second input ports of the intermediate coupler are (directly) optically connected, respectively, to the first and second optical paths downstream of the first and second optical paths; and
  a third and a fourth optical path (directly) optically connected to said first and second output ports of the intermediate coupler, respectively, downstream of the intermediate coupler, wherein a difference in optical length between the third and fourth optical paths is greater than zero;
 an output stage comprising an output coupler having a first and a second input port and a first output port, wherein the first and second input port of the output coupler are optically connected, respectively, to third and fourth optical paths, downstream of the third and fourth optical paths; and a first, a second and a third actuator configured to vary a coupling ratio of said input, intermediate and output couplers, respectively, between a minimum value greater than or equal to zero and a maximum value less than or equal to one; and a command and control unit configured to send a first command signal to said first and third actuators in order to set the coupling ratio of said input and output couplers at a value K1 selected among a plurality of values comprising said minimum and maximum values and at least one value comprised between said minimum and maximum values, and to send a second command signal to said second actuator in order to set the coupling ratio of said intermediate coupler equal to a value K2, wherein $$K1=\sin^2(\theta) \text{ and } K2=\sin^2(A*\theta)$$

with θ greater than or equal to zero and less than or equal to π/2 and A greater than or equal to 1.5 and less than or equal to 2.5.

The terms 'downstream', 'upstream', 'previous', 'subsequent' and the like are referred to the direction of propagation of the optical signal along the device.

By 'optical length' it is meant, as usual, the product of the physical length of the optical path by the effective refractive index at a given optical pulsation.

By 'coupling ratio' of a coupler it is meant, as usual, the ratio between the optical power output to an output port (arbitrarily chosen between at least two output ports of the coupler) and the total optical output power, for a given optical input power in an input port.

By 'optically connected' elements it is meant the feature for which an optical signal can propagate from one element to another, independently by the fact that further elements are interposed between the considered elements.

For 'directly optically connected' elements it is meant that there are no further interposed optical elements.

Without being limited to any theory, according to the Applicant, the aforesaid features allow to induce on an optical signal at the input of the first input port of the input coupler a delay variable at will among a plurality of values between a minimum value (typically determined by the sum of the optical lengths of the shortest optical paths of each stage and by the three couplers) and a maximum value (typically determined by the sum of the optical lengths of the longest optical paths of each stage and by the three couplers), with limited or substantially nil power losses, and with a wide bandwidth, as amply illustrated below.

The present invention in one or more of the aforesaid aspects may have one or more of the following preferred features.

Preferably it is provided preparing a second optical signal and delaying said first optical signal relative to said second optical signal. In this way it is possible to take advantage of the present invention in any application in which it is desired to change the delay of a signal with respect to another (for example in the synchronization of two signals, in the compensation of the polarization dispersion, in the Optical Beam Forming, etc.)

Preferably, said first, second and third actuators are configured to vary said respective coupling ratios with continuity, and said plurality of values of the coupling ratio is a continuous interval of values. In this way the optical delay can be varied at will with continuity. The terms 'continuous', 'continuity' and analogues denote a succession of continuous or closely spaced values, the separation step being determined by the technological limits of realization and/or of operation of the couplers and/or of the actuators.

Preferably the difference between said minimum value and said maximum value of the coupling ratio of each coupler is greater than or equal to 0.4, more preferably greater than or equal to 0.6, still more preferably greater than or equal to 0.8.

Preferably, said minimum value is less than or equal to 0.4, more preferably less than or equal to 0.3, and/or said maximum value is greater than or equal to 0.6, more preferably greater than or equal to 0.7. In this way it is possible to vary the introduced delay on a wide range of values.

Preferably A is greater than or equal to 1.7, more preferably greater than or equal to 1.9, and/or less than or equal to 2.3, more preferably less than or equal to 2.1. Even more preferably A is equal to 2. The applicant has found that when A is equal to 2 the delayed signal, at the operative pulsation, does not undergo any attenuation (within the limits of the constructive non-ideals) for any delay value, and moreover the device exhibits a wide bandwidth. For values of A different but close to 2, an attenuation on the delayed signal, and/or a reduction of the bandwidth, occur/s, which progressively increase/s as much as A deviates from 2.

Preferably each of said input, intermediate and output couplers comprises a respective first and second coupler, each having a respective coupling ratio equal to 0.5, and a pair of optical paths of equal optical length to connect the first and second couplers, wherein said respective actuator is configured to operate on one of said optical paths in such a way as to introduce an optical phase difference 2θ between said optical paths of the coupler, with θ greater than or equal to zero and less than or equal to π/2 as above defined. In this way the device is simple in structure, construction and operation. Preferably, said actuator is selected from the group comprising: thermal actuators, electro-optical actuators, charge-discharge actuators, charge injection actuators, piezoelectric actuators, liquid crystal actuators.

Preferably, the device comprises one or more further intermediate stages optically interposed between said intermediate stage and said output stage, each further intermediate stage comprising:

a further intermediate variable coupler having a first and a second input port and a first and a second output port, wherein the first and second input ports of the further intermediate variable coupler are (directly) optically connected, downstream, respectively to the first and second optical paths of the intermediate stage or of the immediately preceding further intermediate stage;

a further second actuator configured to vary a coupling ratio of said further intermediate coupler between a minimum value greater than or equal to zero and a maximum value less than or equal to one; and a further third and fourth optical paths (directly) optically connected, downstream, to said first and second output ports of the further intermediate variable coupler respectively, wherein a difference in optical length between the further third and fourth optical paths is greater than zero, wherein the first and second input ports of the output variable coupler are (directly) optically connected, respectively, to the further third and fourth optical paths of the immediately preceding further intermediate stage.

Preferably, the command and control unit is configured to send to each of said further second actuators said second control signal in order to set the coupling ratio of the respective additional intermediate coupler equal to said value K2.

Preferably, it is provided to set the coupling ratio of each additional intermediate coupler equal to said value K2. In this way it is possible to increase the variation interval of the optical delay.

Preferably, the difference in optical length between the third and fourth optical paths is equal to the difference in optical length between the first and second optical paths.

Preferably, the difference in optical length between each further third and fourth optical path is equal to the difference in optical length between the first and second optical path. In this way the operative band of the device and/or the Free Spectral Range (or FSR) is/are optimally determined.

BRIEF DESCRIPTION OF THE DRAWINGS

The features and the advantages of the present invention will be further clarified by the following detailed description of some embodiments, presented by way of non-limiting example of the present invention, with reference to the attached figures, in which:

FIG. 2 is a schematic view of an optical delay system according to a further embodiment of the present invention;

DETAILED DESCRIPTION OF THE PREFERRED EMBODIMENTS

Figure 1:
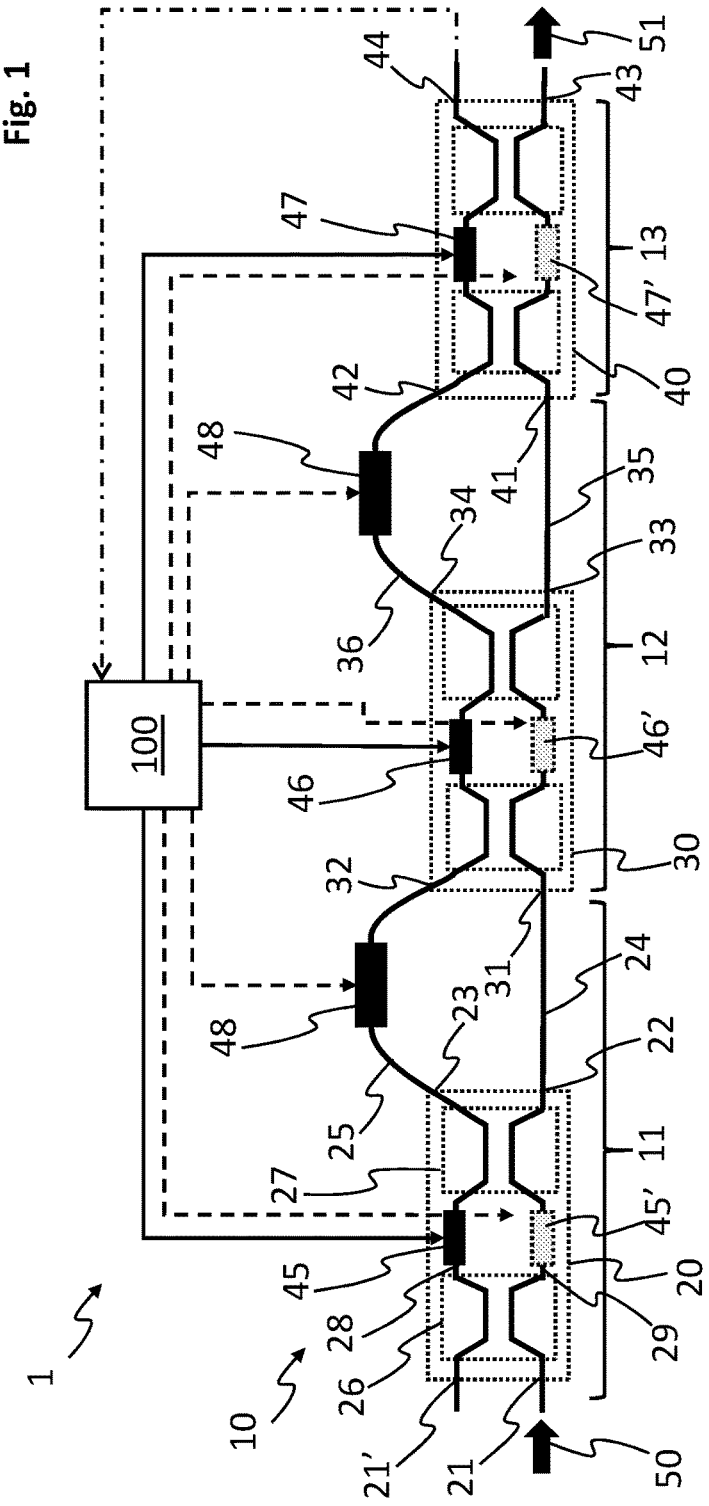
FIG. 1 is a schematic view of an optical delay system according to an embodiment of the present invention.

In the figures an optical delay system 1 according to the present invention is shown. For the purposes of exposition conciseness, the same reference numbers will be used for corresponding elements in the various embodiments.

In the following, reference will be made to an embodiment in optical waveguide (by using optical fibers or, preferably, integrated waveguides). However, the present invention can be implemented (not shown) in free space, for example by using beam splitters, mirrors, etc.

The optical delay system 1 comprises an optical delay device 10, based on the Mach-Zehnder interferometer scheme, comprising a first stage 11, an intermediate stage 12, one or more possible further intermediate stages 12', and an output stage 13.

In the example of FIG. 1 the device 10 comprises only the intermediate stage 12 interposed between the first stage and the output stage 13, while FIG. 2 schematically shows a device 10 having, in addition to the intermediate stage 12 immediately following the first stage 11, any number of further intermediate stages 12' in cascade (as symbolized by the dots 12'), each of them structurally equal to the intermediate stage 12 and interposed between the intermediate stage 12 and the output stage 13.

The first stage 11 comprises a variable input coupler 20 having a first input port 21 and a first and a second output port 22, 23, and a first and a second optical path 24, 25 directly optically connected respectively to the first and second output port 22, 23.

The intermediate stage 12 similarly comprises an intermediate variable coupler 30 having a first and a second input port 31, 32 and a first and second output port 33, 34, wherein the first and second input ports of the intermediate coupler are directly optically connected respectively to the first and second optical path 24, 25 downstream of the first and second optical path. The intermediate stage 12 further comprises a third and a fourth optical path 35, 36 directly optically connected to the first and second output ports 33, 34 of the intermediate coupler, respectively, downstream of the intermediate coupler.

Between the first and the second optical path, and between the third and the fourth optical path, a respective difference in optical length $\Delta L_o 1$, $\Delta L_o 2$ occurs, for example a difference in physical length or an effective refractive index difference or a combination of the two. The difference in optical length $\Delta L_o 1$, $\Delta L_o 2$ is chosen as a function of the maximum optical delay to be imparted, which in turn depends on the specific application of the invention. For example, for the purpose of signal synchronization, the maximum desired overall delay may be of the order of ps, whereas for the Optical Beam Forming of the order of hundreds of ps.

Preferably, the difference in optical length $\Delta L_o 1$, $\Delta L_o 2$ is the same for the first stage and for the intermediate stage.

In general, the delay $\tau$ accumulated by an optical signal that propagates along an optical path (e.g. optical fibre or waveguide) of physical length L, is given by the formula $\tau = L n_g / c$, where $n_g$ is the effective group refraction index of the optical path and c is the speed of light. It is defined group optical length $L_g = L n_g$.

Each stage has a respective difference in optical group length $\Delta L_g$ and can therefore induce a maximum delay variation $\Delta T = \tau_{max} - \tau_{min} = \Delta L_g / c$, with $\tau_{max}$ and $\tau_{min}$ being respectively the maximum and minimum delay of a single stage (the first stage or intermediate stage) calculated at the operating pulsation $\omega_0$. The device 1 can induce a maximum delay variation $\Delta T_{TOT}$ equal to the algebraic sum of the maximum delay variations of the individual stages arranged in cascade.

The output stage 13 comprises a variable output coupler 40 having a first and a second input port 41, 42 and a first output port 43, wherein the first and second input port 41, 42 of the output coupler 40 are optically connected respectively to the third and fourth optical path 35, 36, downstream of the third and fourth optical path.

In the example of FIG. 1, the first and second input port 41, 42 are directly optically connected respectively to the third and fourth optical path 35, 36, while in the example of FIG. 2 the first and second input port 41, 42 of the coupler 40 are connected to the third and fourth optical path 35, 36 by interposing one or more further intermediate stages 12'. The device further comprises a first, a second and a third actuator 45, 46 and 47 (and possible further second actuators 46') configured to vary the coupling ratio of the input 20, intermediate 30 and output couplers 40 (and possible further intermediate couplers 30'), respectively, between a minimum value greater than or equal to zero and a maximum value less than or equal to one.

Each variable coupler 20, 30, 40 can be made in any way, for example (not shown) it can be a thermal effect variable directional coupler.

Preferably, as exemplarily shown in FIG. 1, each coupler 20, 30 (30') and 40 is made on the basis of a balanced Mach-Zehnder interferometer, which comprises a first and second coupler 26, 27 each having a respective fixed coupling ratio equal to 0.5, and a pair of optical paths 28, 29, preferably of the same optical length, to connect the first and second coupler.

Exemplarily, the first and second coupler 26, 27 are directional couplers (as exemplarily and schematically shown), or (not shown) multimode interference couplers (MMI).

Each respective actuator 45, 46 and 47 is configured to operate on at least one of the two optical paths 28, 29 so as to introduce a desired optical phase variation 20 between the optical paths 28, 29 of the coupler, with θ from 0 to π/2. Preferably each actuator is selected from the group comprising: thermal actuators, electro-optical actuators, charge-discharge actuators, charge injection actuators, piezoelectric actuators, liquid crystal actuators.

With reference to the example shown in which the couplers 20, 30, 40 are based on the balanced Mach-Zehnder interferometer, the coupling ratio K of each coupler 20, 30 and 40 to a bar port (i.e. an output port 22 belonging to the same optical path of the chosen input port 21) is given by:

$$K=\sin^2(\theta).$$

Choosing a cross port (i.e. an output port 23 belonging to the optical path opposite to that to which the chosen input port 21 belongs) the coupling ratio is the complementary to one of K. In the present invention any reference to the coupling ratio also includes its complementary value to one. In the examples shown the output port of the delayed signal is the bar port 43 with respect to the input port 21, however it is possible to configure the device 10 so as to use the cross port 44 as an output port for the delayed signal (for example by suitably adjusting the position of the optical paths 24, 25, 35, 36).

As can be seen, K can be varied as desired substantially continuously from 0 to 1 by varying 2θ with continuity from 0 to π by means of the actuator.

The system further comprises a command and control unit 100 operatively connected (for example by means of respective connecting lines shown schematically in the figure with the arrows in continuous line) to the actuators 45, 46 (46') and 47 to send respective control signals to set the respective coupling ratio to a desired value.

In an embodiment, as schematically shown in FIG. 2, the system may comprise one or more further intermediate stages 12' optically interposed between the aforesaid intermediate stage 12 and the output stage 13, each further intermediate stage 12' comprising a further intermediate variable coupler 30' having a first and a second input port directly optically connected, downstream, respectively, to the first and second optical path 35, 36 of the intermediate stage 12 (or of the further intermediate stage immediately preceding), and a further third and fourth optical path 35', 36' having different optical length and directly optically connected, downstream, respectively, to the first and second output ports of the further intermediate coupler 30'. The first and second input ports 41, 42 of the output coupler 40 are directly optically connected, respectively, to the further third and fourth optical path of the further preceding intermediate stage, i.e. the last further intermediate stage.

In a preferred embodiment, the system 1 can comprise a feedback line (shown schematically with a dash-line only in FIG. 1, but also feasible in the embodiment of FIG. 2) configured to detect (for example by means of a photodiode, not shown, optically connected to the port 44) an optical power output from a second output port 44 of the coupler 40 of the output stage 13 and send a feedback signal to the command and control unit 100 as a function of the detected power.

The system 1 can comprise a respective actuator 48 operatively associated with one of the two optical paths of the first stage 11, of the intermediate stage 12 and of each of the possible further intermediate stages 12' to introduce a desired phase variation on the respective optical path.

The system 1 can comprise a further actuator 45', 46' and 47' configured to operate on the other of the two optical paths 28, 29 so as to introduce a desired optical phase variation between the optical paths 28, 29 of the respective coupler.

Preferably, the command and control unit 100 is configured to send a respective correction signal to one or more of the actuators 45', 46', 47', 48 as a function of the received feedback signal.

In an alternative embodiment, not shown because within the reach of the person skilled in the art, the system of the present invention can be based on the Michelson interferometer scheme. For example, the system can comprise the first stage 11 with the first actuator 45 as shown in FIG. 1, and an intermediate coupler provided with reflecting elements (for example reflective discontinuities in the waveguide, such as free faces, or Sagnac rings, multimodal interference reflectors, Bragg gratings, etc.) capable of reflecting the optical signal back again in the first stage 11. For example, the intermediate coupler may comprise the first directional coupler, as shown in FIG. 1, and the first and second optical path, one of which equipped with actuator 46. On each optical path a reflecting element is placed for reflecting the optical signal back again to the first directional coupler. In this case, the output port of the device 10 is the same input port 21 or a second input port 21' of the input coupler 20. Suitable circulators or optical power dividers are optically connected to ports 21 and/or 21' to separate input and output signals and/or feedback signals.

In use, the system 1 can implement the optical delay method of the present invention.

With reference in particular to the embodiment of FIG. 1, the command and control unit 100 sends to the first and third actuators 45, 47 a first command signal, equal for both the actuators and function of the desired overall delay τ.

The first command signal sets the coupling ratio of input 20 and output couplers 40 to the selected value K1, within a continuous range of values between a minimum and maximum value, for example between zero and one, as a function of the desired overall delay τ according to the formula τ−τ$_{min}$=2K1 ΔT.

In the example shown in FIG. 1 the first control signal is representative of a phase change 2θ which the respective actuator gives to the respective optical path, with θ greater than or equal to zero and less than or equal to π/2, wherein in the bar port K1=$\sin^2(\theta)$.

The command and control unit 100 sends to the second actuator 46 a second command signal which sets the coupling ratio of the intermediate coupler equal to a value K2.

In the example shown in FIG. 1 the second control signal is representative of a phase variation that the respective actuator gives to the respective optical path, wherein the phase variation, according to the invention, is equal to 2Aθ, with A greater than or equal to 1.5 and less than or equal to 2.5, and wherein K2=$\sin^2(A*\theta)$.

The optical signal 50 to be delayed is introduced into the first input port 21 of the input coupler 20 and acquires an optical delay τ during propagation along the optical delay device 10. The delayed optical signal 51 is emitted from the first output port 43 (bar port) of the output coupler 40.

Preferably the unused output port of the device (cross port 44) can be used to select and/or stabilize the working point. The signal coming out from the port 44 is used to generate an error signal (for example, but not only, through a photodetector which converts the optical signal into an electrical signal). The unit 100 uses the error signal to control the actuators. For example, by controlling the actuators 45', 46', 47' the unit 100 ensures that the respective couplers realize the desired coupling ratio and, by controlling the actuators 48, the unit 100 selects and stabilizes the operating pulsation $\omega_0$.

Figure 3B:
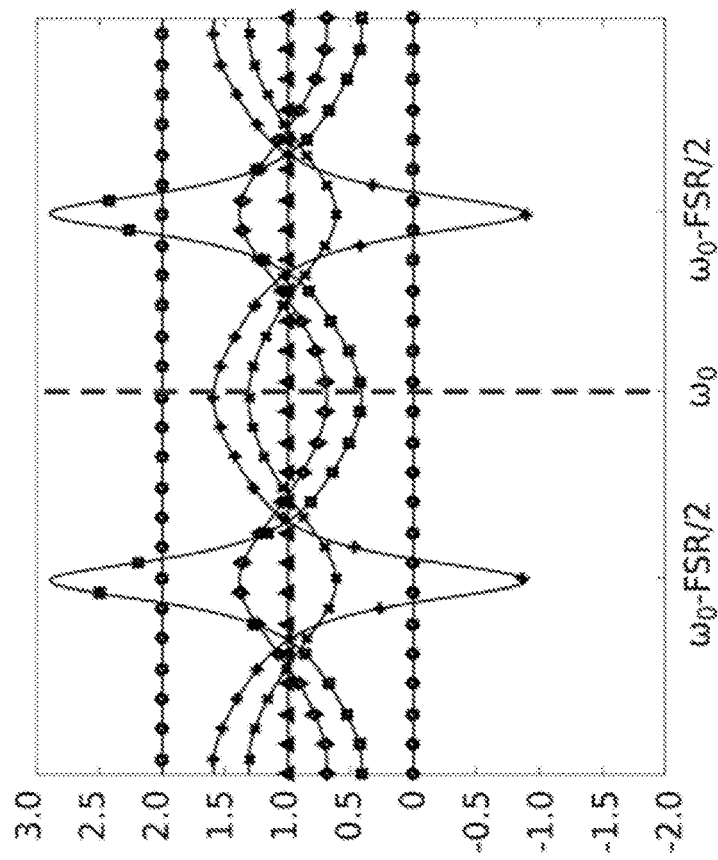
FIGS. 3a-c and 4a-c show the operating features of a delay system according to the present invention and of a comparative example, respectively.
Figure 3A:
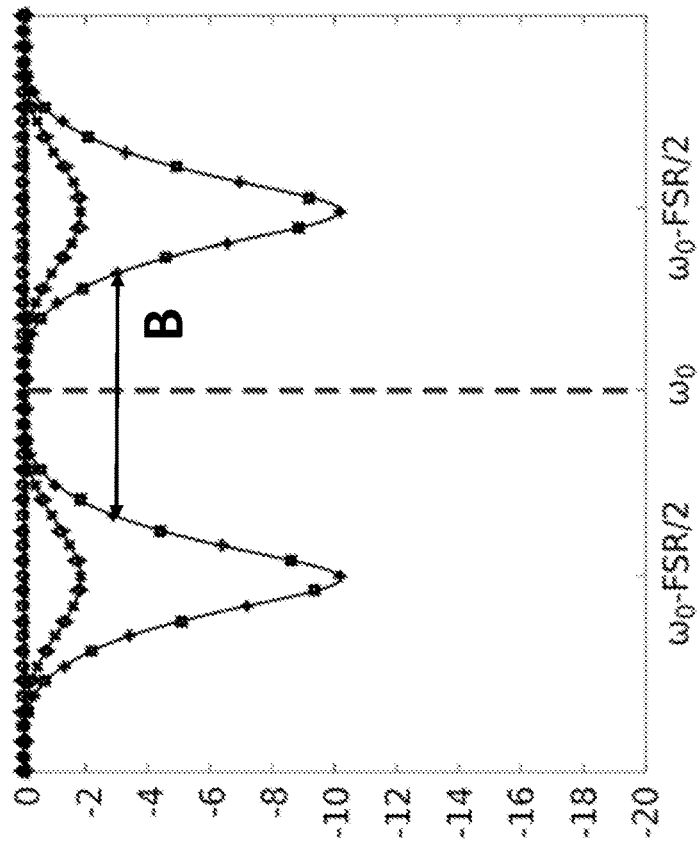
Figure 3C:
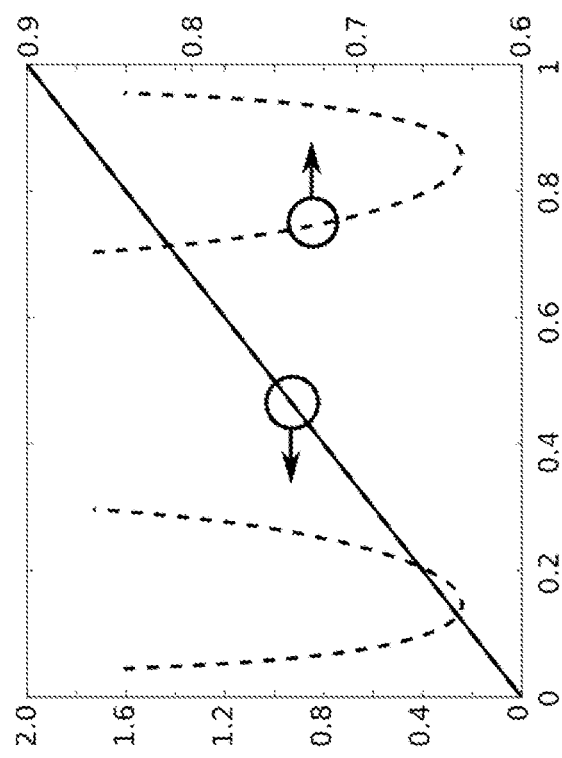

FIGS. 3a, 3b and 3c show the behaviour of the system 1 of FIG. 1 (with only two stages) with A=2, wherein the difference in group length of the intermediate stage is equal to that of the first stage $\Delta L_g 1 = \Delta L_g 2 = \Delta L_g$.

The different lines of FIGS. 3a, 3b, 4a and 4b correspond to different values of K1 (with respect to the bar port) according to the following legend of the symbols on the lines: circles: K1=0 ($\theta$=0 and K2=0); circles: K1=1 ($\theta$=$\pi$/2 and K2=0); squares: K1=0.3 ($\theta$=0.582 and K2=0.84); rhombuses: K1=0.4 ($\theta$=0.684 and K2=0.960); triangles: K1=0.5 ($\theta$=$\pi$/2 and K2=1); (x): K1=0.6 ($\theta$=0.885 and K2=0.960) and (+): K1=0.7 ($\theta$=0.993 and K2=0.84).

FIG. 3a shows the power transmission in dB of the delayed optical signal as a function of the optical pulsation in rad/s, wherein $\omega_0$ is the operative pulsation of the system 1 (for example given by $\omega_0 \Delta L_o/c = (2N+1)\pi$ with N integer and $\Delta L_o$ the difference in optical path of a single stage) and FSR is the spectral free field of the system 1. As shown in FIG. 3a, at the operating pulsation $\omega_0$ the delayed signal does not undergo any loss of power for any value of K1. It is defined 'bandwidth' B the width of the band around the operating pulsation at which the attenuation of the optical signal is less than or equal to 3 dB, as indicated by the double arrow in FIGS. 3a and 4a. The normalized bandwidth is defined as B/FSR.

FIG. 3b shows the normalized optical delay of the delayed optical signal as a function of the optical pulsation (in rad/s) of the system 1. By normalized optical delay it is meant $(\tau - \tau_{min})/\Delta T$ with $\tau$ the actual delay.

FIG. 3b shows that at the operating pulsation, the normalized delay can be varied at will with continuity from zero up to two times $\Delta T$.

FIG. 3c shows the normalized optical delay (continuous line and left scale) and the normalized bandwidth (dashed line and right scale) at the operating pulsation, as a function of the coupling ratio K1 (on the horizontal axis). The normalized delay increases linearly with K1. The normalized bandwidth is always kept above 0.6, with a minimum value around K1=0.15 and K1=0.85.

Figure 4C:
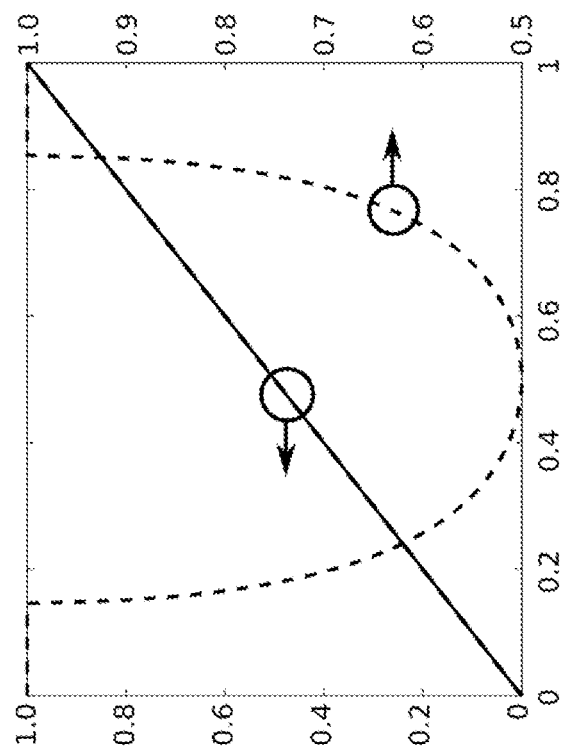
Figure 4B:
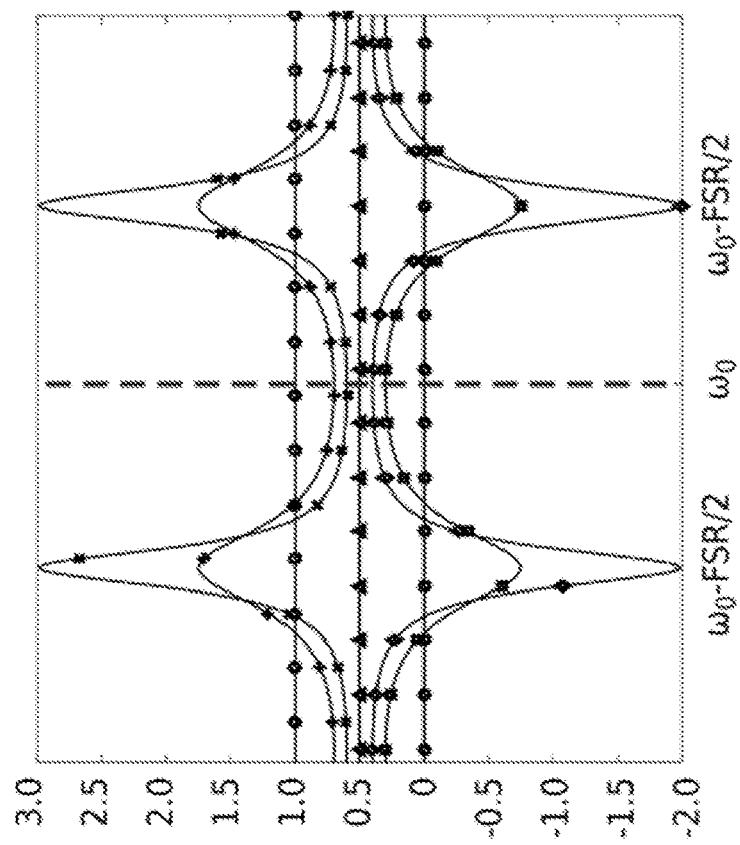
Figure 4A:
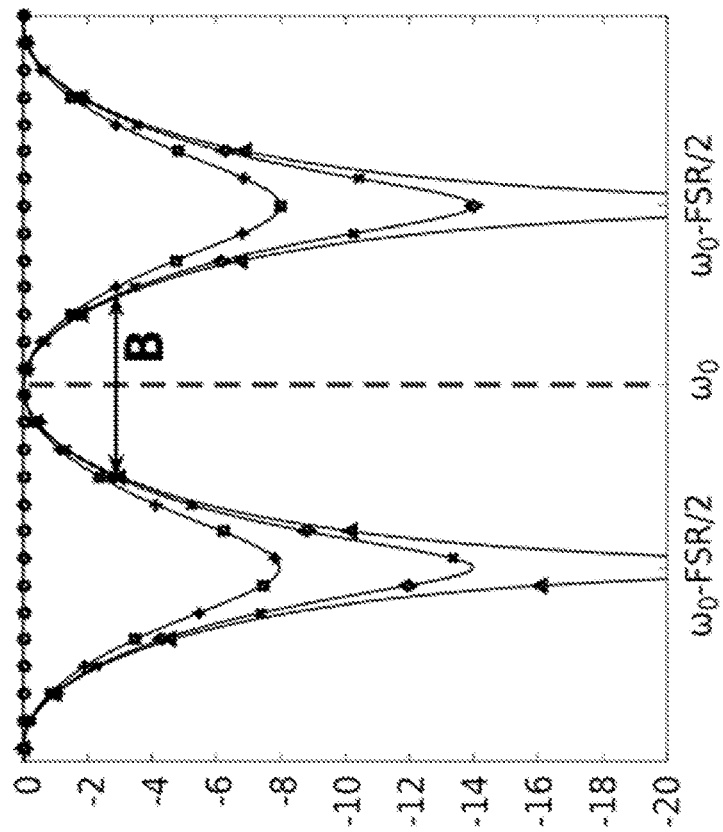

FIGS. 4a, 4b and 4c show the behaviour of a comparative optical delay system, consisting solely in the first stage 11 of FIG. 1 directly coupled to the output stage 13 of FIG. 1. In other words, this system has a structure similar to that shown in FIG. 1, without the entire intermediate stage 12 together with the respective actuators.

As shown in the figures, the optical delay varies linearly and continuously between 0 and $\Delta T$ according to the formula $\tau - \tau_{min} = K1 \, \Delta T$ and the minimum normalized bandwidth is equal to 0.5 at K1=0.5.

The present invention can be used in various applications, for example in the control of the delay of a signal or of the relative delay between two signals (for example, due to the need for synchronization); in the control of the relative delay of the various signals that feed each element of an array antenna (Optical Beam Forming Networks); in sensors (eg Brillouin sensors); in the control of the relative phase of radio frequency signals in Radio-on-Fiber systems; in the compensation of the polarization dispersion.

The invention claimed is:

1. An optical delay method comprising:
   providing an optical delay device comprising:
      a first stage comprising a variable input coupler having a first input port, a first output port and a second output port, and a first optical path and a second optical path optically connected, respectively, to said first output port and said second output port, wherein a difference in optical length between the first optical path and the second optical path is greater than zero;
      an intermediate stage comprising:
         an intermediate variable coupler having a first input port and a second input port and a first output port and a second output port, wherein the first input port and the second input port of the intermediate coupler are optically connected, respectively, to the first and second optical paths downstream of the first optical path and the second optical path;
         a third optical path and a fourth optical path optically connected to said first output port and said second output port of the intermediate coupler, respectively, downstream of the intermediate coupler, wherein a difference in optical length between the third optical path and the fourth optical path is greater than zero;
      an output stage comprising a variable output coupler having a first input port and a second input port and a first output port, wherein the first input port and the second input port of the output coupler are optically connected, respectively, to the third optical path and the fourth optical path, downstream of the third optical path and the fourth optical path,
   wherein each of said input coupler, said intermediate coupler and said output coupler comprises a respective first and second coupler, each having a respective coupling ratio equal to 0.5, and two respective optical paths to connect the respective first and second couplers;
   selecting a value K1 among a plurality of values comprising a minimum value greater than or equal to zero, a maximum value less than or equal to one and at least one value between said minimum and maximum values;
   setting a coupling ratio of said input coupler and said output coupler equal to said selected value K1, wherein K1=$\sin^2(\theta)$ with $\theta$ greater than or equal to zero and less than or equal to $\pi$/2, wherein $\theta$ is equal to half of an optical phase variation introduced between said two respective optical paths of each of said input coupler and said output coupler;
   setting a coupling ratio of said intermediate coupler equal to a value K2, wherein K2=$\sin^2(A*\theta)$,
A being a parameter having a value selected in the interval from 1.5 to 2.5, extremes included;
   introducing a first optical signal into said first input port of said input coupler;
   delaying said first optical signal by an optical delay by propagating said first optical signal along said optical delay device;
   picking up said delayed first optical signal from said first output port of said output coupler.

2. The method according to claim 1, comprising preparing a second optical signal and delaying said first optical signal relative to said second optical signal.

3. The method according to claim 1, wherein said plurality of values of the coupling ratio is a continuous interval of values, wherein a difference between said minimum value and said maximum value of the coupling ratio of each coupler is greater than or equal to 0.4, and wherein said minimum value of the coupling ratio is less than or equal to 0.4, and/or said maximum value of the coupling ratio is greater than or equal to 0.6.

4. The method according to claim 1, wherein A is greater than or equal to 1.7.

5. The method according to claim 1, wherein said two respective optical paths have equal optical length.

6. The method according to claim 1, wherein the device comprises one or more further intermediate stages optically interposed between said intermediate stage and said output stage, each further intermediate stage comprising:
   a further intermediate coupler having a first input port and a second input port and a first output port and a second output port, wherein the first input port and the second input port of the further intermediate coupler are optically connected, downstream, respectively to the first optical path and the second optical path of the intermediate stage or of the immediately preceding further intermediate stage; and
   a further third optical path and fourth optical path optically connected, downstream, to said first output port and said second output port of the further intermediate coupler, respectively, wherein a difference in optical length between the further third optical path and the further fourth optical path is greater than zero,
   wherein the first input port and the second input port of the output coupler are optically connected, respectively, to the further third optical path and the further fourth optical path of the immediately preceding further intermediate stage,
   wherein the method further comprises setting the coupling ratio of each further intermediate coupler equal to said value K2.

7. An optical delay system comprising:
   an optical delay device comprising:
      a first stage comprising a variable input coupler having a first input port and a first output port and a second output port and a first optical path and a second optical path optically connected to said first output port and second output port, respectively, wherein a difference in optical length between the first optical path and the second optical path is greater than zero;
      an intermediate stage comprising:
         an intermediate variable coupler having a first input port and a second input port and a first output port and a second output port, wherein the first input port and the second input port of the intermediate coupler are optically connected, respectively, to the first optical path and the second optical path downstream of the first optical path and the second optical path; and
         a third optical path and a fourth optical path optically connected to said first output port and said second output port of the intermediate coupler, respectively, downstream of the intermediate coupler, wherein a difference in optical length between the third optical path and the fourth optical path is greater than zero;
      an output stage comprising an output coupler having a first input port and a second input port and a first output port, wherein the first input port and the second input port of the output coupler are optically connected, respectively, to third optical path and the fourth optical path, downstream of the third optical path and the fourth optical path,
   wherein each of said input coupler, said intermediate coupler and said output coupler comprises a respective first and second coupler, each having a respective coupling ratio equal to 0.5, and two respective optical paths to connect the respective first and second couplers; and
   a first actuator, a second actuator and a third actuator configured to vary a coupling ratio of said input, intermediate and output couplers, respectively, between a minimum value greater than or equal to zero and a maximum value less than or equal to one; and
   a command and control unit configured to send a first command signal to said first actuator and said third actuator to set the coupling ratio of said input coupler and said output coupler at a value K1 selected among a plurality of values comprising said minimum and maximum values and at least one value between said minimum and maximum values, and to send a second command signal to said second actuator in order to set the coupling ratio of said intermediate coupler equal to a value K2, wherein $K1 = \sin^2(\theta)$ and $K2 = \sin^2(A*\theta)$ with $\theta$ greater than or equal to zero and less than or equal to $\pi/2$, wherein $\theta$ is equal to half of an optical phase variation introduced between said two respective optical paths of each of said input coupler and said output coupler and A is a parameter having a value selected in the interval from 1.5 to 2.5, extremes included.

8. The system according to claim 7, wherein said first actuator, said second actuator and said third actuator are configured to vary said respective coupling ratios with continuity.

9. The system according to claim 7, wherein said two respective optical paths have equal optical length.

10. The system according to claim 7, wherein the device comprises one or more further intermediate stages optically interposed between said intermediate stage and said output stage, each further intermediate stage comprising:
   a further intermediate coupler having a first input port and a second input port and a first output port and a second output port, wherein the first input port and the second input port of the further intermediate coupler are optically connected, downstream, respectively to the first optical path and the second optical path of the intermediate stage or of the immediately preceding further intermediate stage;
   a further second actuator configured to vary a coupling ratio of said further intermediate coupler between a minimum value greater than or equal to zero and a maximum value less than or equal to one; and
   a further third optical path and a further fourth optical path optically connected, downstream, to said first output port and second output port of the further intermediate coupler, respectively, wherein a difference in optical length between the further third optical path and the further fourth optical path is greater than zero,
   wherein the first input port and the second input port of the output coupler are optically connected, respectively, to the further third optical path and the further fourth optical path of the immediately preceding further intermediate stage, and
   wherein the command and control unit is configured to send to each of said further second actuators said second command signal in order to set the coupling ratio of the respective further intermediate coupler equal to said value K2.

* * * * *